US008214765B2

(12) United States Patent
Holm-Petersen et al.

(10) Patent No.: US 8,214,765 B2
(45) Date of Patent: Jul. 3, 2012

(54) CANVAS APPROACH FOR ANALYTICS

(75) Inventors: Morten Holm-Petersen, Gentofte (DK); George G. Robertson, Seattle, WA (US); Christian Olaf Abeln, Ödåkra (SE); Thomas Michael Casey, Bellevue, WA (US); Stella Yick Chan, Redmond, WA (US); Benjamin L. Chronister, Duvall, WA (US); Ian Michael Dunmore, Redmond, WA (US); Roland Fernandez, Woodinville, WA (US); Danyel Fisher, Seattle, WA (US); David Francis Gainer, Redmond, WA (US); Alexandre Gorev, Sammamish, WA (US); Ahmed Kamal, Bellevue, WA (US); Matthew Jay Kotler, Bellevue, WA (US); Murali R. Krishnan, Kirkland, WA (US); Bongshin Lee, Issaquah, WA (US); Greg Schechter, Seattle, WA (US); Curtis G. Wong, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 553 days.

(21) Appl. No.: 12/142,889

(22) Filed: Jun. 20, 2008

(65) Prior Publication Data
US 2009/0319562 A1 Dec. 24, 2009

(51) Int. Cl.
*G06F 3/048* (2006.01)

(52) U.S. Cl. ......... 715/838; 717/109; 715/855; 715/854

(58) Field of Classification Search .................. 715/838, 715/215, 789, 854, 783, 712; 707/756; 714/37
See application file for complete search history.

(56) References Cited

U.S. PATENT DOCUMENTS

| 5,911,138 | A * | 6/1999 | Li et al. ............................... 1/1 |
| 7,502,971 | B2 * | 3/2009 | Cohen et al. ..................... 714/45 |
| 7,607,079 | B2 * | 10/2009 | Reiner ........................... 715/233 |
| 7,774,295 | B2 * | 8/2010 | Middelfart et al. .................... 1/1 |
| 7,827,502 | B2 * | 11/2010 | Scheu et al. .................... 715/765 |
| 2004/0027370 | A1 * | 2/2004 | Jaeger ............................. 345/716 |
| 2005/0132297 | A1 * | 6/2005 | Milic-Frayling et al. ...... 715/745 |
| 2005/0289561 | A1 * | 12/2005 | Torres et al. .................... 719/328 |
| 2007/0260476 | A1 * | 11/2007 | Smolen et al. .................... 705/1 |
| 2008/0120574 | A1 * | 5/2008 | Heredia et al. ................. 715/835 |
| 2008/0133973 | A1 * | 6/2008 | Mizoe et al. ..................... 714/37 |
| 2008/0183680 | A1 * | 7/2008 | Meynier et al. ..................... 707/3 |
| 2009/0100021 | A1 * | 4/2009 | Morris et al. ...................... 707/3 |
| 2009/0183102 | A1 * | 7/2009 | Hernandez et al. ............ 715/771 |

* cited by examiner

*Primary Examiner* — William Bashore
*Assistant Examiner* — Di Xiao
(74) *Attorney, Agent, or Firm* — Lee & Hayes, PLLC

(57) ABSTRACT

The claimed subject matter relates to an architecture that can construct a map for summarizing analyses with respect to data included in a database. In addition, the architecture can display the map in a special canvas area. Generally, the map is a hub-and-spoke-style map in which a hub is associated with an entity (e.g., a related set of records) included in a database. Likewise, the spokes are typically representative of operations (e.g., filter, join, transform) that act upon the hub/entity from which it extends. The map can aid with open-ended analysis on complex databases by recording and ordering competing hypotheses and can also further collaborative efforts with respect to analysis.

18 Claims, 10 Drawing Sheets

CANVAS APPROACH FOR ANALYTICS

BACKGROUND

With the combination of advances in communication frameworks, processing power, cheaper and more abundant data storage, automated transaction recordation, data mining techniques, more efficient storage schema, as well as enterprise globalization and numerous other factors, more data than ever before is being collected and analyzed for a variety of purposes. Common goals of analyzing this ever-increasing data include efforts to increase efficiency, optimize transactions, problem-solving, and so forth.

However with so much data available, associated databases have increased in size tremendously. As a result, making sense of that data is no longer a trivial task, and solutions to a given analytical task can be hidden in subtle or complex ways within vast data sets. For example, in the field of Enterprise Resource Planning (ERP) as well as other areas, a growing amount of human and computer-based resources are being devoted to data analysis. Conventional tools for visualizing data in a desktop environment have evolved considerably. Thus, it can be a simple matter to visually chart an underlying relational database in order to arrive at a given hypothesis as to a particular problem or inefficiency. However, open-ended analysis on complex data sets often leads to complex exploration and/or multiple competing hypotheses, for which conventional tools are not adequately equipped to handle in a convenient or efficient manner.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises an architecture that can facilitate a canvas approach to data analysis. In accordance therewith and to other related ends, the architecture can provide and utilize a canvas interface area to display a visual or graphical summary of analyses performed in connection with a database. More particularly, data analysis can be conducted in a distinct workspace, wherein operations that act on a set of related data records (e.g., an entity) can be charted or otherwise displayed. As this analysis progresses, the architecture can automatically populate the canvas with a map that provides a shorthand history or breadcrumb-like trail of the analysis to facilitate aid in a variety of ways.

For example, the map can be a hub-and-spoke style map, with the entity being displayed as a hub and the operation depicted as a spoke that radiates from the hub. Appreciably, all operations that act upon a first entity can be represented as separate spokes, potentially terminating at a second hub that represents a second entity that is, say, a filtered subset of the first entity, e.g., when the operation is a filter or slice of the first entity. As analysis in the workspace proceeds, additional objects can be displayed in the canvas to represent distinct branches of the analytical exploration. In essence, the map can be generated based upon a semantic history of the analytical work conducted in the workspace. The map can therefore be referenced to aid in data analysis, auditing with respect to conclusions or charts, as well as for a learning tool.

In an aspect of the claimed subject matter, objects (e.g. hubs, spokes, etc.) in the canvas can be annotated to indicate or articulate certain hypotheses, insights gleaned from the analysis, and/or to indicate a quality of a particular branch or object. These annotations can be recorded and stored in the map to aid in continuing analysis, tracking pivotal data points or paths, indicating dead-ends, or for later presentation of the analytical work. Given that the map is associated with the semantic history of operations conducted in the workspace rather than the full-fledged data representation displayed in the workspace, the map can be a lightweight representation or descriptor with associated pointers that can be more readily propagated and shared between collaborating parties as well as provide improved means of securing data during collaboration.

In another aspect of the claimed subject matter, the canvas can include multiple layers, each representing a distinct map. Although not necessarily the case, typically, each map across all layers will be identical to the others, the primary distinction being that each map operates on a different underlying data set. For example, a single database can have multiple versions or might be scrubbed in some way; or each layer can represent a disparate data source, generally with a similar shape. Accordingly, one layer can include a map loaded with the current database, one with a past version of that database and one in which the database has been cleaned, scrubbed, or otherwise modified in some way. In yet another aspect of the claimed subject matter, the goal of analyses as well as the ultimate solution can be aggregated and stored to a library. Accordingly, the library can accumulate numerous sets of template maps that can be indexed by the goal or type of analysis and that include the solutions discovered during prior analytical work. The library can be network accessible and thus leveraged by subsequent authorized parties. Appreciably, the library can maintain additional information and can support features such as guided tours through the map with video and narrative.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
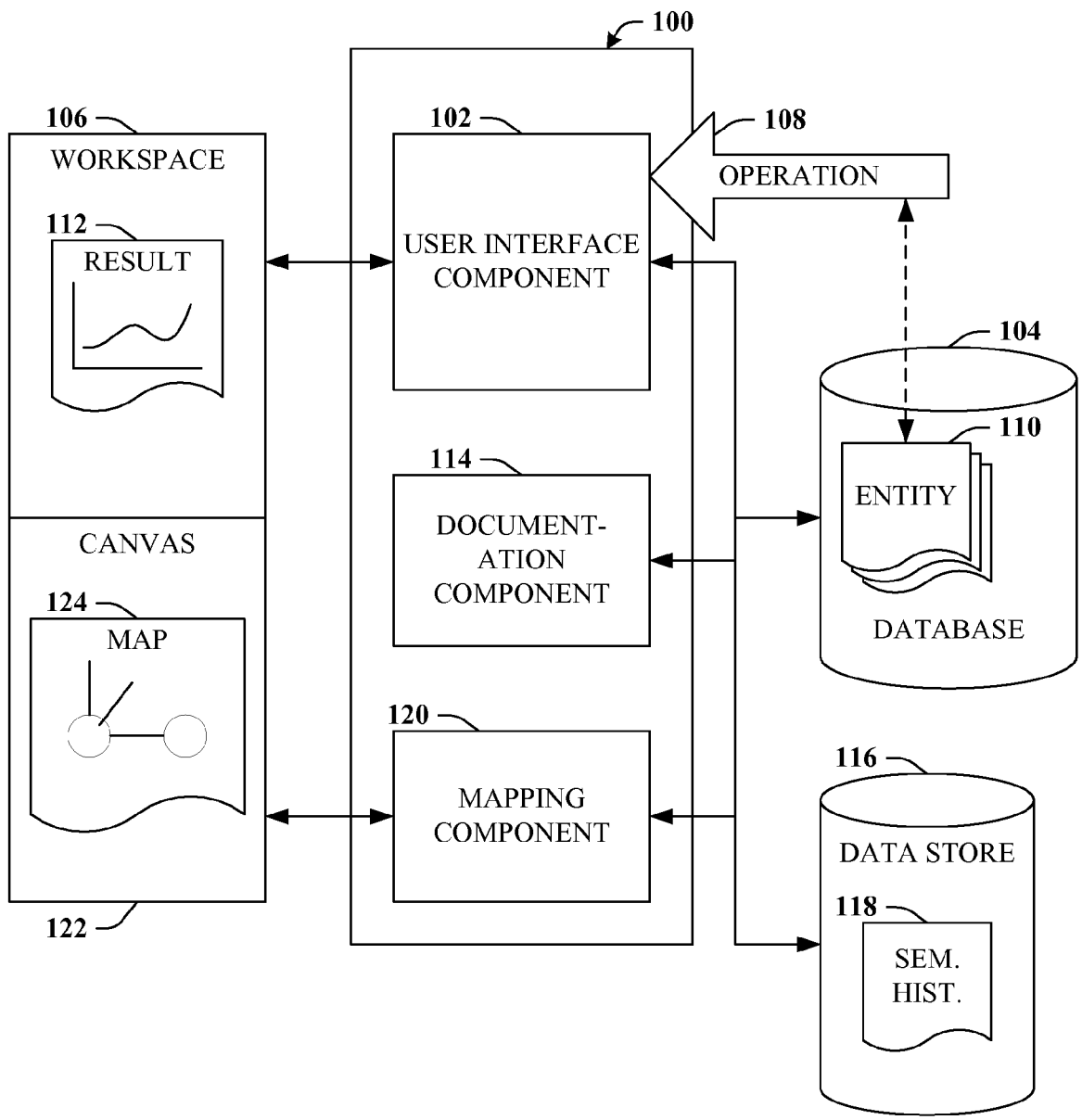
FIG. 1 illustrates a block diagram of a system that can provide a canvas interface to facilitate summarization of analyses with respect to data included in a database.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, system 100 that can provide a canvas interface to facilitate summarization of analyses with respect to data included in a database is depicted. Generally, system 100 can include user interface component 102 that can be operatively connected to database 104 and workspace 106. Database 104 is typically all or a portion of a large relational database and/or unified data warehouse component customarily associated with an organization or business establishment, or transaction records or histories thereof. For example, database 104 can include information sets conducive to Enterprise Resource Planning (ERP), Materials/Manufacturing Resource Planning (MRP), or the like. However, it should be understood that database 104 can also be substantially any data repository with structured elements or unstructured elements that are suitably labeled. Moreover, database 104 can be a collection of one or more databases or spreadsheets and can be cached locally to support off-line analysis.

Likewise, workspace 106 can be substantially any hardware or software type display such as a monitor, desktop, or windowed section, and can include associated input components as well as substantially any other I/O components suitable for a computer-based interface environment. For example, user interface component 102 can receive operation 108 and can then display in workspace 106 result 112 of operation 108. Typically, operation 108 will be associated with entity 110 (as depicted by the broken line), where entity 110 can be one or more sets of related records included in database 104. By way of illustration, operation 108 can be a filter operation, a slice operation, an aggregation operation, a sort operation, or a join operation, and so forth that acts on entity 110. The representative effects of operation 108 can be output to workspace 106 as result 112. As another example, operation 108 can be a purely visual transformation such as, e.g., switching between a bar chart and a pie chart, wherein the representative data is not altered. Appreciably, operation 108 can also be a transformation as well, and need not necessarily operate upon entity 110, but can instead operate upon another aspect of database 104 or upon other data (e.g., arithmetic operations or transforms).

Regardless, result 112 will typically be represented as a chart or some other manner of visualizing or structuring data included in or associated with database 104 such as a graph with various values plotted along labeled axes. Generally, operation 108 will include a small number of parameters, but it should be appreciated that for larger parameter sets and/or for compound operations 108, result 112 can include multiple dimensions and other features to aid in visualization. For example, result 112 can be displayed in 2D or even 3D and additional dimensions required based upon the set of parameters included in operation 108 can be implemented with varying colors, shapes, animation, and so on.

In accordance therewith, it can be readily understood that workspace 106 can be utilized for numerous practical applications associated with data analysis such as ERP-based optimization, examination, summarization, and/or troubleshooting. Appreciably, much of the analysis can be open-ended analysis in which an analyst is generally aware of a particular problem or inefficiency, but is not certain as to the root cause or causes. Thus, the analyst will typically input a variety of operations 108, each yielding a relevant result 112. Based upon examination of a given result 112, the analyst might develop a hypothesis about the cause of the inefficiency, and then drill down further into the data to further test or verify the hypothesis. Commonly in such a scenario, the analyst will develop multiple hypotheses with respect to the root causes or other contributing factors, and each of these competing hypotheses will typically entail examination of disparate sets of data. Accordingly, as the analyst follows one data path to a dead-end that, say, falsifies one hypothesis, the analyst will oftentimes struggle to get back to previous paths that could yield insight, or struggles to remember other competing hypotheses.

In order to mitigate the above, system 100 can include documentation component 114 that can record to data store 116 (or database 104) a semantic history 118 of both operation 108 and entity 110. Accordingly, documentation component 114 can store semantic history 118 of all or a portion of a set of operations 108 applied by an analyst, such as when interacting with workspace 106. In addition, semantic history 118 can include as well information relating to entities 110 upon which each of the operations 108 acted. It should be understood that semantic history 118 can be a lightweight representation or pointer that does not necessarily include the underlying data, but rather, e.g. only semantic descriptions, instructions, and/or references to that data as defined by operation 108 and/or entity 110. It should be further understood that data store 116 is intended to be a repository of all or portions of data, data sets, or information described herein or otherwise suitable for use with the claimed subject matter. Thus, although depicted as distinct components data store 116 can include all or portions of database 104. Data store 116 can be centralized or distributed, potentially across multiple devices and/or schemas and can be embodied as substantially any type of memory, including but not limited to volatile or non-volatile, sequential access, structured access, or random access and so on. It should be understood that all or portions of data store 116 can be included in system 100, or can reside in part or entirely remotely from system 100.

In addition, system 100 can further include mapping component 120 that can graphically display in canvas 122 a representation of semantic history 118. In particular, mapping component 120 can display map 124 (e.g., a hub-and-spoke representation of semantic history 118), wherein entity 110 can be represented in map 124 as a hub and operation 108 that acts upon entity 110 can be represented in map 124 as a spoke that radiates from the hub. Canvas 122 can be substantially similar to workspace 106 in that canvas 122 can be implemented as virtually any type of hardware or software (or a combination thereof) display and can include suitable I/O components for rich interface or interaction. Canvas 122 can be coupled to, and exist as a portion or an extension of workspace 106, such as when implemented within the same desktop, window, or monitor. However, it should be appreciated that in such cases, there will usually be a clear demarcation (visually or otherwise) between workspace 106 and canvas 122 and I/O policies or rules for interaction will typically differ. For example, canvas 122 can be displayed as a thin strip of screen real estate at the top or bottom of workspace 106.

In another aspect, mapping component 120 can potentially poll or discover the available display space such as what display capabilities a coupled system has or a number of monitors or display areas or surfaces that are available. Based upon this information, mapping component 120 can determine or infer a suitable location, size, shape, orientation and so forth for canvas 122. Further details relating to workspace 106 and canvas 122 can be found with reference to FIG. 2.

Figure 2:
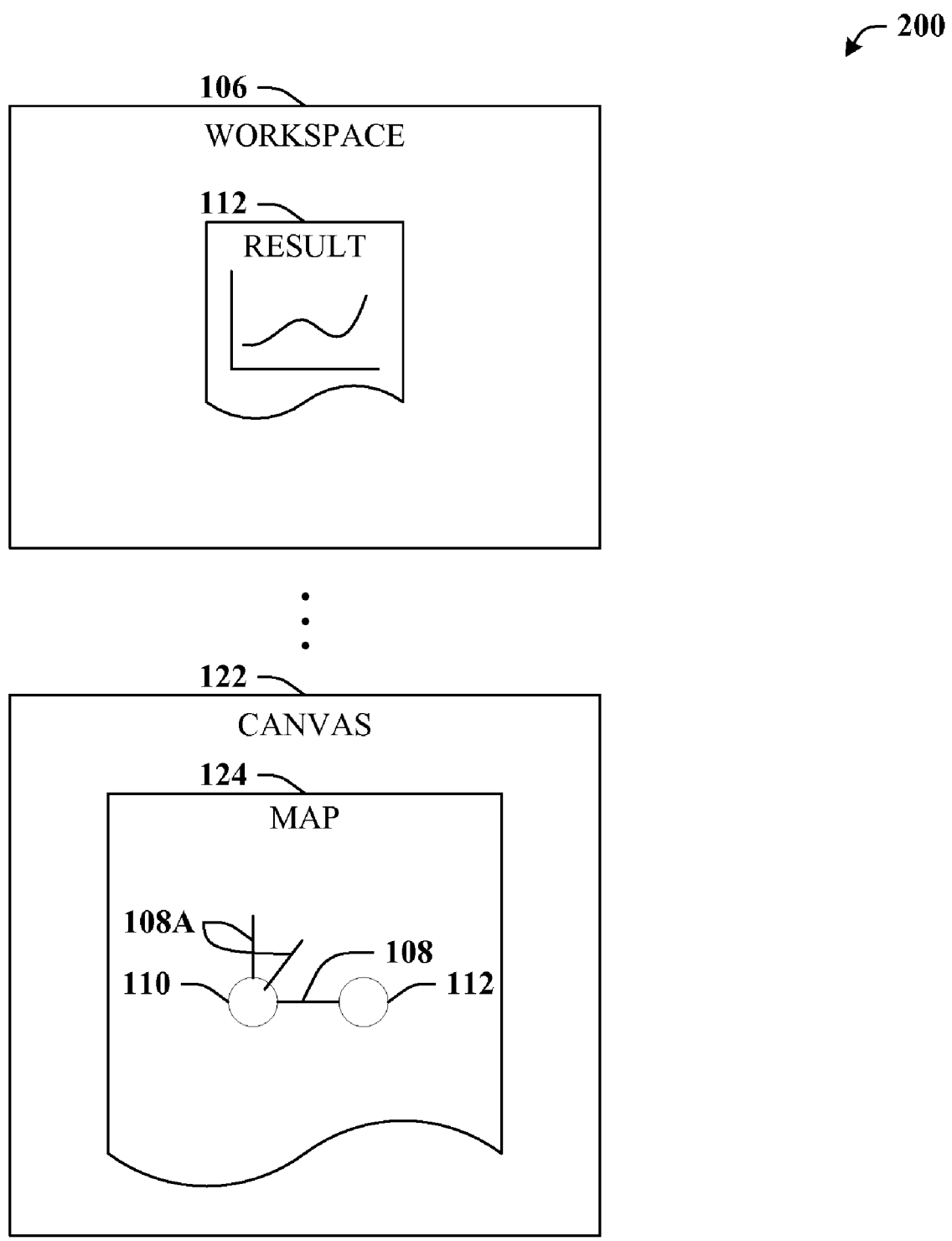
FIG. 2 illustrates an example display of a work environment in accordance with the subject claims.

While still referring to FIG. 1, but turning also to FIG. 2, system 200 illustrates an example display of a work environment in accordance with the subject claims. System 200 can include one or more monitors, devices, or display surfaces or areas. In the case of multiple monitors, devices, or display surfaces, workspace 106 and canvas 122 can be allocated to independent areas, devices, or surfaces. It should be appreciated that in such a case, workspace 106 and canvas 122 can be, but need not be, integrated into a common desktop scheme or environment that spans multiple displays. In other cases, workspace 106 and canvas 122 can be independently rendered by different computing resources, potentially subscribing to disparate operating platforms (e.g., various client-server models).

As described supra, workspace 106 can be populated with result 112 by user interface component 102 in response to operations 108. As operations 108 are received by user interface component 102, mapping component 120 can populate canvas 122 with an associated hub-and-spoke map 124 that depicts semantic history 118 of operations 108. For instance, a filter operation (e.g., operation 108) applied to customer records (e.g., entity 110) in database 104 can yield an associated chart (e.g., result 112) displayed in workspace 106. In connection with the above, mapping component 120 can generate, potentially in real-time, associated map 124. Map 124 can include a first hub to represent entity 110 (e.g., customers) while various joins, filters, etc. associated with customer records can be displayed in map 124 as spokes emanating from that hub (e.g. spoke/operation 108 or alternate spokes/operations 108A). In an aspect of the claimed subject matter, result 112 that is displayed in workspace 106 can be represented in map 124 in thumbnail form as a second hub (e.g., hub representing result 112, possibly stripped of headers, labels and the like) graphically connected to the first hub representing customer entity 110 by the spoke (e.g. spoke representing filter operation 108 on customer entity 110). Appreciably, spokes 108A can represent data analysis paths that did not lead to substantial insight and were thus abandoned in the course of analysis. It should be understood, however, that map branches 108A could have several additional hubs or spokes, even though illustrated to dead-end after only a single operation/spoke 108A for the sake of brevity.

In order to provide additional context, but not necessarily to be construed as limiting the spirit or scope of the claimed subject matter, the following exemplary scenario is provided and will be used here and in later portions to demonstrate various additional features of the claimed subject matter. Consider a manager of a business enterprise involved in ERP analysis. Various weekly, monthly, and/or quarterly reports have indicated a steep rise in product returns, so the manager is tasked with discovering the source of this problem. In conventional situations, the manager will employ some type of visual analysis upon records in an ERP database in a manner consistent with what can be displayed in workspace 106. For example, the manager will initially select a charting tool or a statistical software package to work with in workspace 106. Next, the initial data source and/or entity 110 can be selected in order to generate the first hub. Generally, the manager will try out or at least hypothesize about several different paths of analysis, some of which will either immediately or after some bit of trial-and-error, lead to a dead-end with respect to the source of the product return problem. On the other hand, a number of these analysis paths will be promising and require deeper exploration, yet it will not always be clear which path will lead to the correct solution or provide additional insight to the solution. Moreover, even paths that initially appear to be dead-ends can sometimes later help explain a particular phenomenon with respect to the data or help identify other more promising paths.

Accordingly, documentation component 114 can record semantic history 118 of the manager's analysis. Based upon this semantic history 118, mapping component 120 can generate map 124 that can graphically display a breadcrumb-like trail of various branches of analysis that correspond to different analytical paths the manager attempted in workspace 106.

To further flesh out this example, assume the manager first looks at the aggregate of all products that have been returned, say, in the past year. This data entity, all products returned in the past year, can appear in map 124 as the first hub. Next the manager looks at returns by customer, which can be a new spoke in map 124 that originates from the hub. The manager realizes there is definitely some insight into the problem to be found here, but at this point it is still too complex a problem to isolate just based upon the current information. Thus, the manager backtracks a bit and filters the first entity/hub by customer group, and then another filter based upon customer region, each of which can produce a second and third spoke, respectively, emanating from the first hub. These latter two spokes are then dismissed as not showing any relevant correlation, so the manager returns to the broader customer data corresponding to the first spoke. From here, the manager slices this subset by vendor and then by sales staff and then by shipping agent and then by warehouse, producing four more spokes. Appreciably, these latter four spokes can originate from the base spoke as a filtered subset or from a second hub (e.g., an entity 110 defined as customers who returned the product in the past year) created at the end of the first spoke that itself originated from the entity described by product returns in the past year.

At this point, the manager hypothesizes the problem might have arisen from a particular salesperson, perhaps due to misrepresenting product features. The manager also considers the alternate hypotheses that a particular shipping agent or a particular warehouse might have damaged the products, resulting in the returns, or even a combination of these three hypotheses. Each of these hypotheses can bear further exploration, but it should be appreciated that map 124 can be constructed to aid and structure the present and future analysis. It should also be underscored that while certain results 112 can be embedded in map 124 in thumbnail form as a hub, such results 112 can also be placed as thumbnails proximal to a particular hub or a particular spoke.

Figure 3:
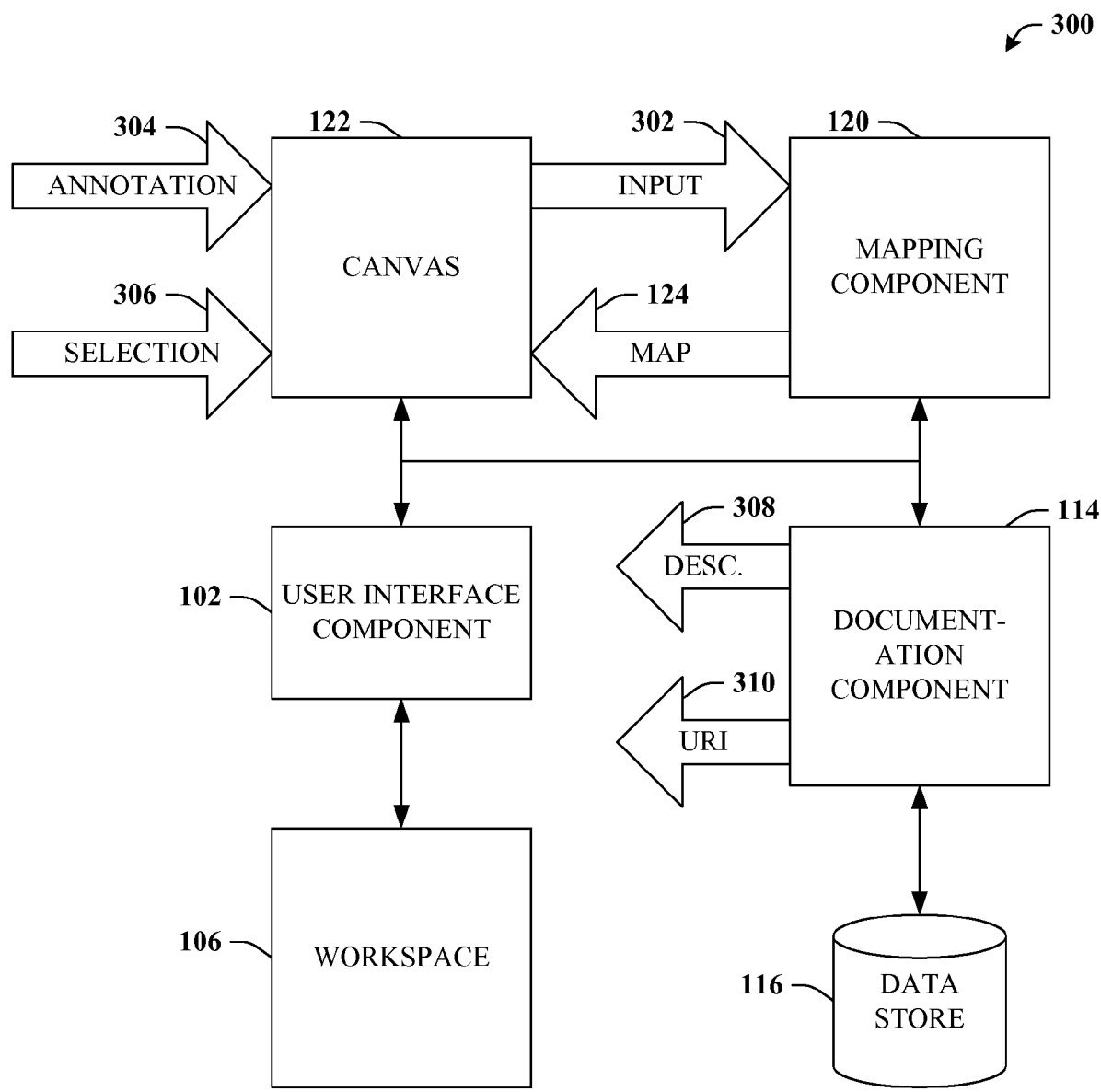
FIG. 3 depicts a block diagram of a system that can receive various inputs from canvas 122.

With reference now to FIG. 3, system 300 that can receive various inputs from canvas 122 is provided. In general, system 300 can include mapping component 120 that can graphically display map 124 of semantic history 118 in canvas 122, as well as other components described supra in connection with FIG. 1. In an aspect of the claimed subject matter, mapping component 120 can receive input 302 from canvas 122. For example, input 302 can be representative of interactions or transactions associated with canvas 122 such as an annotation 304 or a selection 306.

Annotation 304 can relate to an insight apparent from analysis conducted in workspace 106. For example, returning to the example scenario relating to product returns introduced above, at several junctures in the analysis, the manager readily concluded that a particular path of analysis was or was not useful. Accordingly, the manager can comment to this or another affect by directly annotating map 124 with an indication of a quality of an associated branch of map 124, and can do so in the form of annotation 304.

It should be understood that annotation 304 can include at least one of text, ink gestures or handwriting, audio/visual content such as voice-overs or video, a thumbnail, animation or instructions for animation, an icon or the like. In an aspect, annotation 304 can be selected from a set of pre-defined objects or articles such as default text that states, e.g., "strong correlation," "insight, but no solution," "leads to a dead-in" or the like. As another example, annotation 304 can be in the form of an icon that can be, e.g. selected from a collection of icons, say, icons that represent an eye in various states to represent the quality of the branch in the map such as a closed eye to represent a dead-end or no particular insight; an eye that is half-open to represent potential insight, perhaps requiring further exploration; and an eye that is wide open to represent a solution to a problem or analysis that is very likely to lead to such. Appreciably, documentation component 114 can record annotation 304 or a lightweight semantic representation of annotation 304, and mapping component 120 can display annotation 304 to canvas 122, e.g., applied to a suitable location of map 124. As can be readily understood, such an approach can provide numerous advantages. For example, annotations 304 can be quite easily input by a user and simpler and easier to quickly understand when working with predefined or standard annotations 304. Moreover, machine learning techniques and/or inferences can be more readily accomplished with a set of known semantics.

Additionally or alternatively, input 302 can be representative of selection 306. Selection 306 can be, e.g. a selection of a portion of map 124 such as when the manager in the present example scenario clicks on a hub, spoke, or another object in map 124 displayed on canvas 122. In response to selection 306, user interface component 102 can display in workspace 106 an associated analysis defined by the selected portion in full detail. Thus, the manager can revisit a previous analysis path at a particular juncture and can then easily modify available parameters, perform additional operations 108, and/or investigate or explore the local data further. For example, if the manager selected a particular hub or spoke or thumbnail in map 124, the underlying semantics used to create map 124 can be translated back to the source data. Accordingly, by selecting a particular object displayed in canvas 122, user interface component 102 can access database 104 and present to workspace 106 a chart or other representative analysis (e.g. result 112) that was originally explored at that stage of analysis. Accordingly, the manager can quickly navigate between competing hypotheses (or portions thereof) in a manner that is as simple and convenient as navigating branches of map 124, and furthermore need not be forced to remember all the potential paths and hypotheses during analysis.

In accordance with the foregoing, it should be readily appreciated that documentation component 114 can convert semantic history 118 of analyses performed in workspace 106 into a lightweight extensible description 308 that defines map 124 and can also define or reference underlying data such as links to entities 110 included in database 104 or operations 108 performed thereon. This extensible description 308 can conform to extensible markup language (XML) or some other suitable specification or protocol. Hence, mapping component 120 can interpret the description 308 to display map 124 to canvas 122. Furthermore, user interface component 102 can also interpret the description 308 to display result 112 to workspace 106 such as in response to selection 306.

In an aspect of the claimed subject matter, documentation component 114 can convert a portion of semantic history 118 of analyses performed in workspace 106 to a network accessible uniform resource identifier (URI) 310 (or similarly a URL). Furthermore, URI 310 can be embedded in an associated graphical object included in map 124 to provide a reference link to associated data. It should be understood that map 124, annotation 304, description 308, URI 310 as well as other elements described herein can be stored to data store 116 for later access or recall.

Resuming the above-mentioned scenario with the features described herein and it can be readily appreciated that the manager can perform substantially any relevant analysis directed to determining the source of the high product returns, where the analysis is displayed in workspace 106. Simultaneously, map 124 can be automatically generated in canvas 122, wherein map 124 can illustrate which filters, visualizations, parameter correlations or combinations or other operations 108 the manager attempted. In addition, the branches depicted in map 124 that led to insight can be annotated, and thus marked as relevant or emphasized in some manner, while other branches can be designated to be or automatically de-emphasized, such as fading out of the map or being grayed out to a degree.

In a final or condensed form of map 124 these de-emphasized portions can still be accessible, but the more relevant portions, typically annotated as such or inferred to lead to the solution, can be more readily apparent and rearranged or straightened out to provide a clear diagram of the solution. Accordingly, upon arriving at a particular solution, the manager can have a breadcrumb trail of where important insights were discovered and these can be readily strung together or inserted into a presentation to provide an explanation of the analysis.

In an aspect of the claimed subject matter, mapping component 120 can facilitate ready collaboration on a given task. For example, given that map 124 can be readily exported in lightweight forms such as pointers and/or paths, and can include URIs or URLs to reference additional data, one can readily appreciate a scenario in which collaboration is fostered. For instance, consider a scenario in which multiple analysts are each working to solve the product return dilemma. Each analyst can work on his or her own local or independent workspace 106, but canvas 122 can be shared by all analysts. Thus, mapping component 120 can, e.g. color code output to canvas 122 such as a particular branch of map 124 based upon the identity (e.g., machine, login ID, or passport) of the contributing workspace 106 or associated analyst. Changes from each analyst can be automatically or manually requested to be synchronized with that of other analysts over the network. The foregoing can be accomplished in a peer-to-peer manner or by way of one or more servers. In some cases, such as during collaboration, security issues can arise. As a way to mitigate certain security issues with respect to data security, it should be appreciated and understood authentication can be required in a tiered manner. For example, access to view map 124 might require one level of security, but in order to drill down into the underlying data such as that which might be available in workspace 106, another level of security can be required.

In another aspect of the claimed subject matter, mapping component 120 can populate disparate layers of canvas 122 with various maps. In accordance therewith, canvas 122 can include a second layer, wherein the second layer includes a second map of semantic history that is substantially identical to semantic history 118 of map 124. However, while the description of the second map can be the same, the underlying data can be different. For example, map 124 can be based upon operations 108 in connection with database 104, whereas the second map can be based upon identical operations 108, but as applied to a second database that has a substantially similar shape as database 104. As one example, the disparate database can be a different version of database 104, such as a newer version, an older version, a scrubbed or cleaned version or the like. It should be understood that in the case where the disparate database does differ from database 104 in terms of shape, as much of the second map as makes sense can be applied to the disparate database.

It can be readily appreciated that employing layers as substantially described can facilitate visualization of changes over time (e.g., each layer includes a map based upon the same database at different time periods), whereby at different stages in time the underlying data sets can include somewhat different data. Such can facilitate visualization in a step-by-step manner while cycling through the different data sets and observing the changes in the associated map (e.g., map 124). The aforementioned features can provide important insight for many types of analysis. As one example, again returning to the product returns scenario, suppose the manager concluded that the bulk of the problem stems from a particular shipping agent who consistently damaged the goods during shipping. By employing the features described supra, the manager can conveniently re-load the map 124 including the final analysis on a daily or weekly basis to determine if the problem is improving while, for example, another department or staff person can discuss the matter with the shipping agent, or while another shipping agent is acquired.

Figure 4:
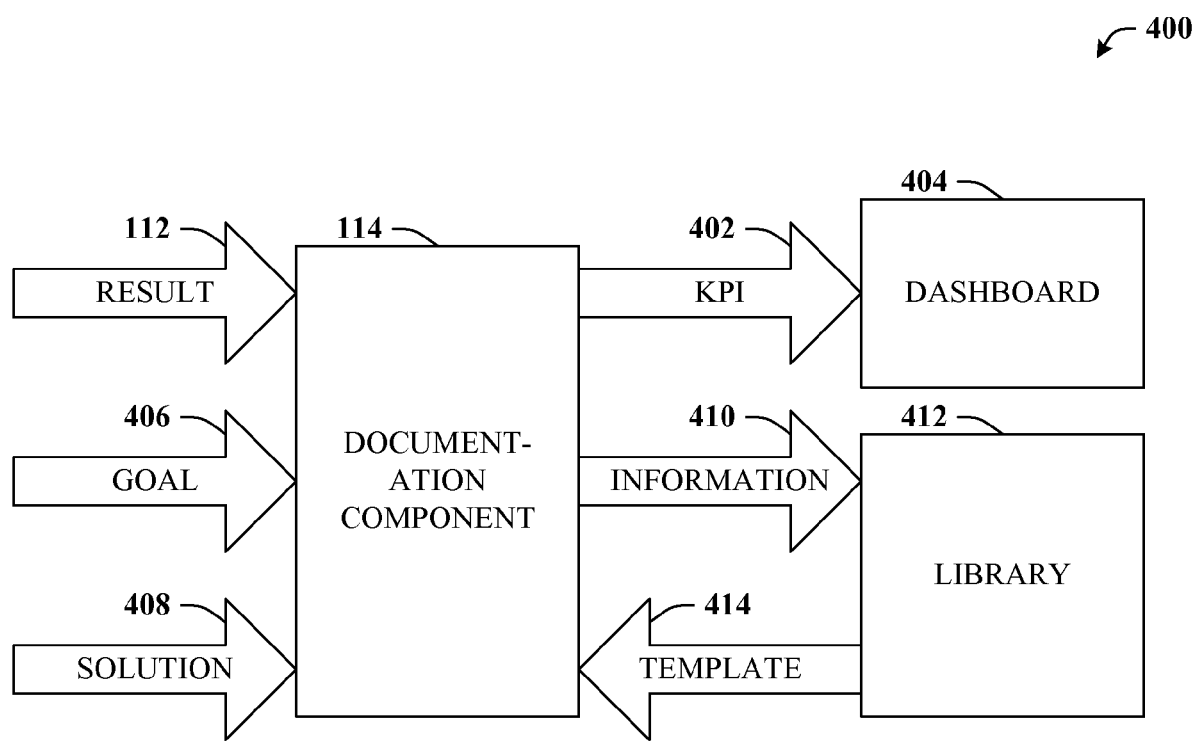
FIG. 4 illustrates a block diagram of a system that can facilitate monitoring and/or suggestions with respect to data analysis.

Referring to FIG. 4, system 400 that can facilitate monitoring and/or suggestions with respect to data analysis is depicted. Generally, system 400 can include documentation component 114 that can record to data store 116 semantic history 118 of both operations 108 and associated entities 110 as substantially described supra. In addition, documentation component 114 can receive result 112 or a reduction of result 112. The reduction can be performed by documentation component 114 or another component and can be, e.g., a key performance indicator (KPI). For example, whereas result 112 can be a full-fledged chart with complex analysis, the KPI can be a reduced chart or simply a numeric value obtained from one or more functions or equations. In particular, the KPI can highlight the largest or most relevant or important changes in the chart.

Regardless of the type or construction of the KPI, documentation component 114 can record the semantics of the KPI to data store 116. In addition, documentation component 114 can provide a lightweight semantic KPI description 402 to dashboard 404. Dashboard 404 can be, e.g., a gadget, bug, or another application or applet that provides visual indicia of the KPI and/or other information. For example, the KPI can include a relatively small number of data points, and dashboard 404 or another suitable application can display, e.g., current values, previous values, target values and the like. Thus, extending the scenario above in which the manager re-loads map 124 to monitor the status of the problem with the shipping agent, the manager can alternatively or additionally utilize dashboard 404 without the need to load the map on a daily basis or throughout the day, but still monitor if the issue is being resolved. It should be further appreciated that in many situations the KPI can be received based upon feed formats and/or push techniques such as by way of Really Simple Syndication (RSS). Appreciably, such can be especially pertinent to receiving the KPI on a cellular phone or another mobile device.

In an aspect of the claimed subject matter, documentation component 114 can aggregate and/or transmit information 410. Information 410 can be associated with either or both goal 406 or solution 408. In more detail, goal 406 can be a goal or objective of analyses conducted in workspace 106. For instance, in the scenario referred to throughout this description, the manager has been conducting analyses in order to ascertain the root cause of a recent spike in product returns. In that scenario, discovering the root cause of the recent increase in product returns can be goal 406. Likewise, as the manager ultimately determined that the cause or at least one of the primary contributors to this problem was mistreatment of the goods by a shipping agent, this determination can represent solution 408, in which the analytical course of this discovery has been duly tracked and recorded by map 124. It should be appreciated that goal 406 need not be unstructured as described in the preceding text. Rather, goal 406 can also be structured to a desired degree. For example, a query of data yielding a view together with a selection of the data and a predefined question selected (e.g., by a user) from an available menu. The predefined question might be, for example, "What caused this sudden change in the data?"

In accordance therewith, information 410 can be aggregated in order to create and/or transmitted to library 412. Thus, library 412 can include suggested analyses paths or template maps 414 for a particular stated problem. Hence, the manager can state his problem (e.g., to discover the source of rising product returns), and the ultimate insight as to this problem can be recorded as well (e.g., the shipping agent was largely responsible), either by manual designation from the manager or by an inference based upon map 124 as well as associated annotations 304. Appreciably, over time, library 412 can grow to include any number of common problems with associated solutions. Thus, a subsequent analyst can, e.g., state she is attempting to discover why product returns have recently risen and can be provided one or several templates 414 as suggested paths of analysis to discover the solution, one of which could be all or portions of map 124 created during the manager's analyses. Therefore, templates 414 can be, say, the 5 most common solutions to the stated problem, 3 analytical paths not yet tried by the analyst that are deemed to be most likely to provide the solution, or the like.

Accordingly, it should be appreciated and understood that library 412 can be network accessible by any suitable means and can be utilized as a centralized repository of information. Moreover, documentation component 114 can retrieve from library 412 any relevant template 414 or map 124 based upon input that relates to goal 406 or a stated problem. In addition, it should be understood that all or portions of library 412 can be included in data store 116.

Figure 5:
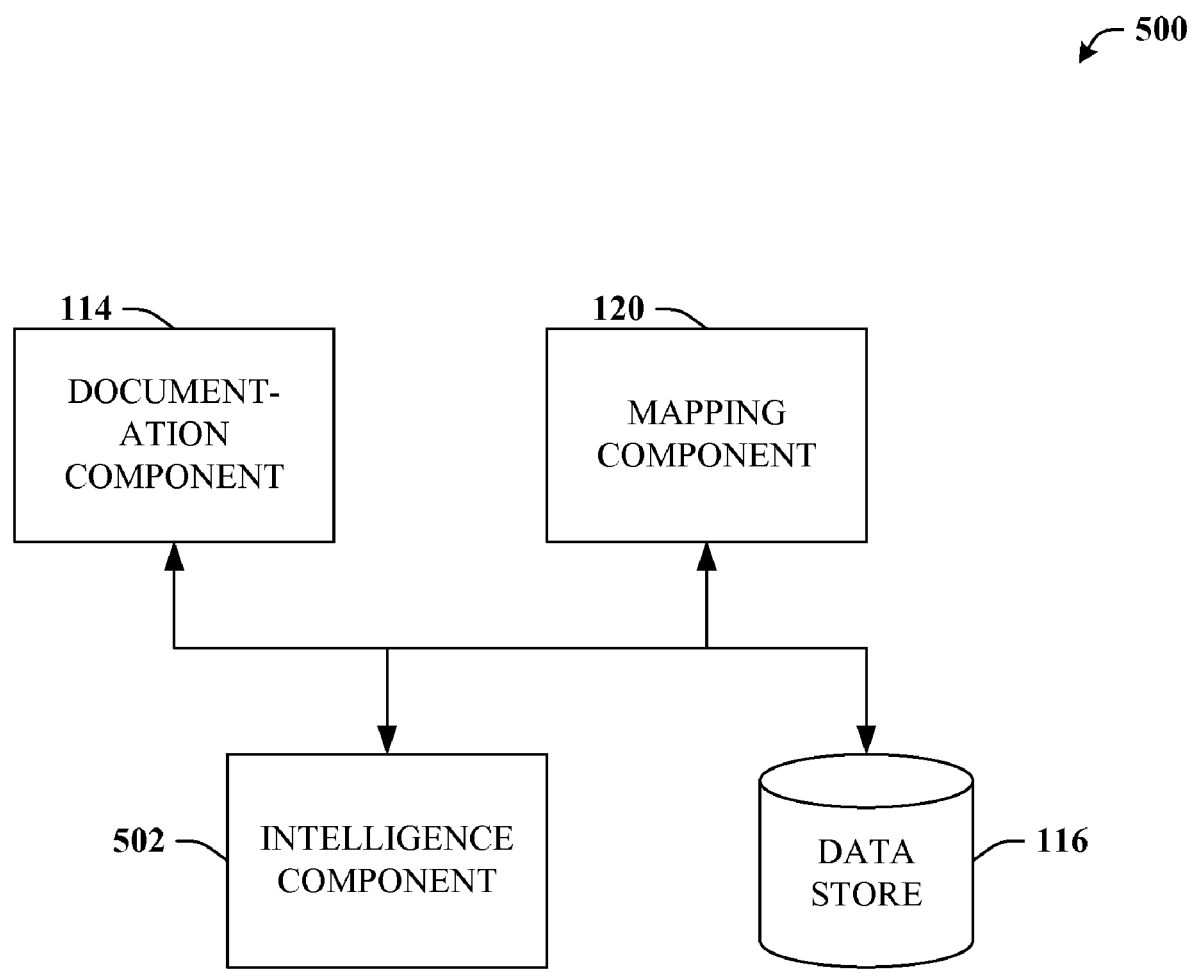
FIG. 5 is a block diagram of a system that can aid with various determinations or inferences.

With reference now to FIG. 5, system 500 that can aid with various determinations or inferences is depicted. Typically, system 500 can include documentation component 114 and mapping component 120, which in addition to or in connection with what has been described supra, can also make various inferences or intelligent determinations. For example, documentation component 114 can employ machine learning techniques or inferences to intelligently determine goal 406 or solution 408. Most notably, such inferences can be desired when the appropriate data is not explicitly input by, e.g., a user or data analyst. To the accomplishment of the foregoing, determinations or inferences can be based upon one or both an initial data set or entity 110 selection as well based upon examination of annotations 304. For instance, if a user initially accesses product returns or makes an annotation similar to "this chart is one possible explanation for the recent rise in product returns . . . " then goal 406 can be suitably inferred. Similarly, one or both analytical paths near the conclusion of analysis or annotations 304 can be utilized to infer when solution 408 has been obtained. In particular, once a solution to an analytical task has been discovered, there is generally not much substantive exploration after that fact. Moreover, pre-defined annotations 304 can be used to designate the most relevant analytical path, which can further provide insight as to solution 408.

Likewise, mapping component 120 can make intelligent determinations with respect to constructing map 124 in canvas 122 as well as a suitable location and other display characteristics relating to canvas 122. For example, mapping component 120 can infer which paths are most relevant in a manner similar to the determination of solution 408 (e.g. the latter portions of analysis, in connection with annotations, etc.). Furthermore, mapping component 120 can intelligently determine a best shape or layout for map 124 as well as which parts to emphasize or de-emphasize, which can be a useful aspect during presentation of map 124 or in connection with reducing map 124 to a final format. Further still, mapping component can determine or infer where to place and how to orient and size canvas 122 based upon, e.g. available display space, either hardware, software, or a combination thereof.

In addition, system 500 can also include intelligence component 502 that can provide for or aid in various inferences or determinations. It is to be appreciated that intelligence component 502 can be operatively coupled to all or some of the aforementioned components. Additionally or alternatively, all or portions of intelligence component 502 can be included in one or more components described herein. Moreover, intelligence component 502 will typically have access to all or portions of data sets described herein, such as data store 116, and can furthermore utilize previously determined or inferred data.

Accordingly, in order to provide for or aid in the numerous inferences described herein, intelligence component 502 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 6:
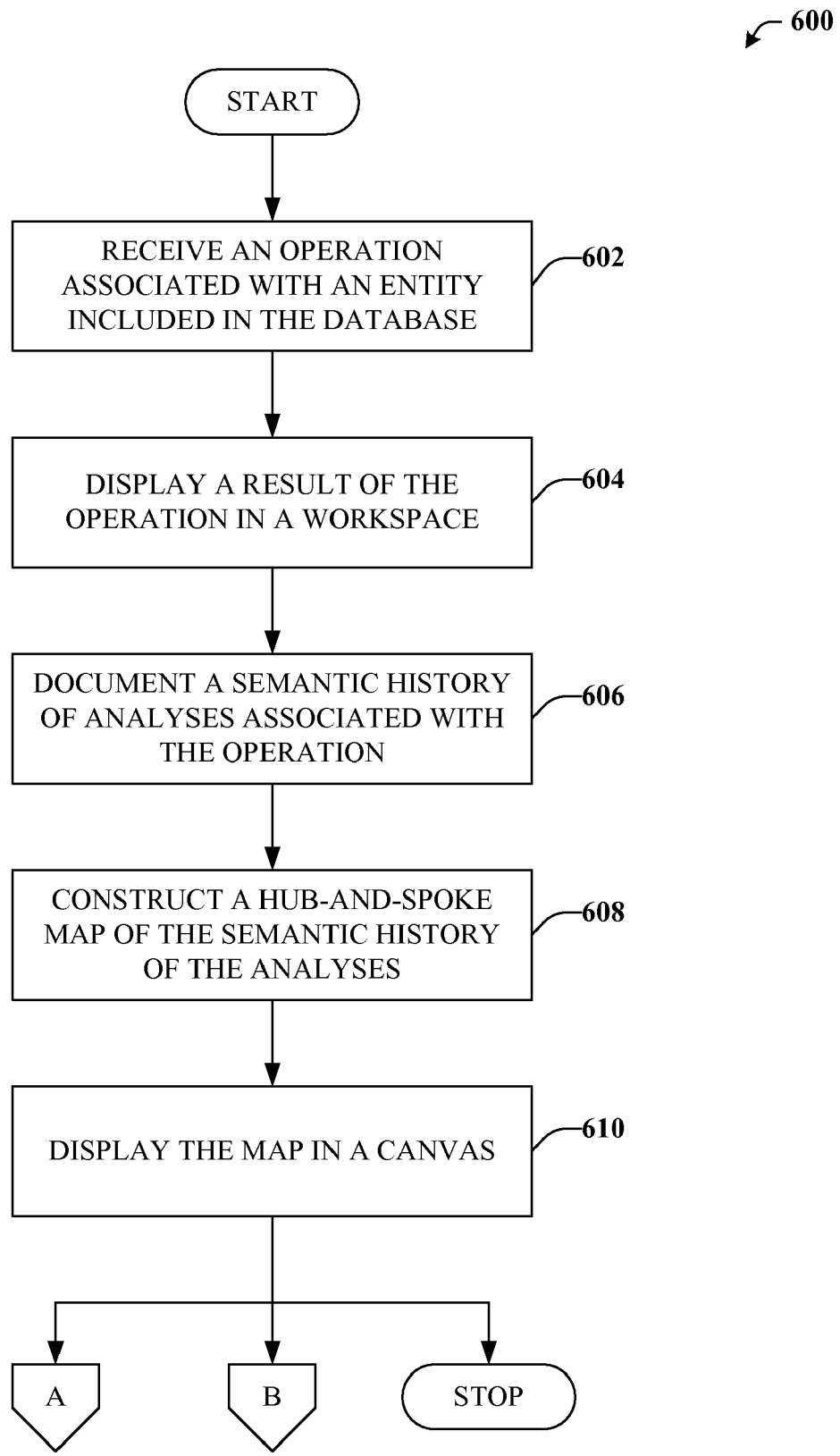
FIG. 6 depicts an exemplary flow chart of procedures that define a method for constructing a map for summarizing analyses with respect to data included in a database and for displaying the map in a canvas space.
Figure 7:
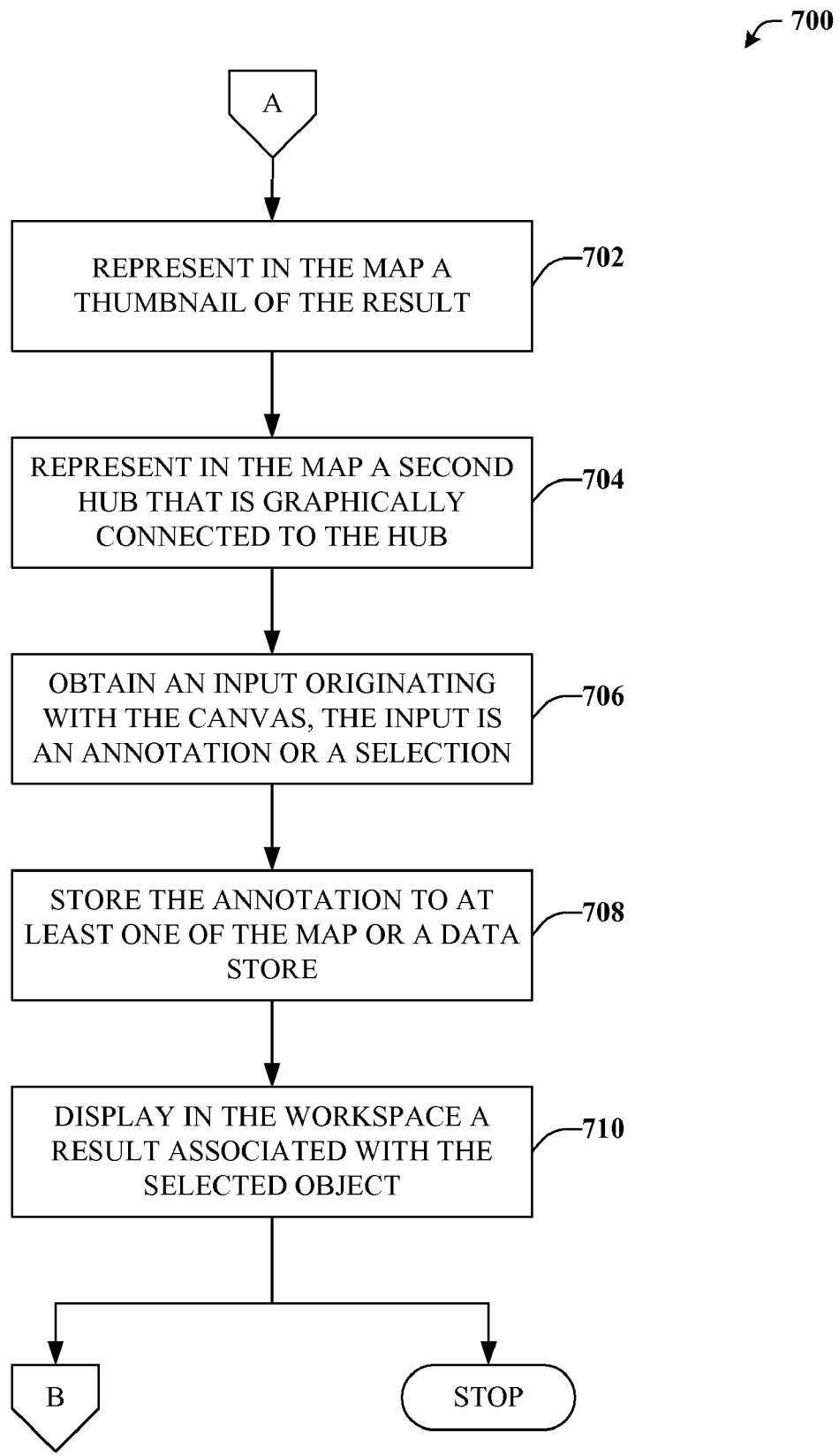
FIG. 7 illustrates an exemplary flow chart of procedures that define a method for providing additional features with respect to the map displayed in the canvas.
Figure 8:
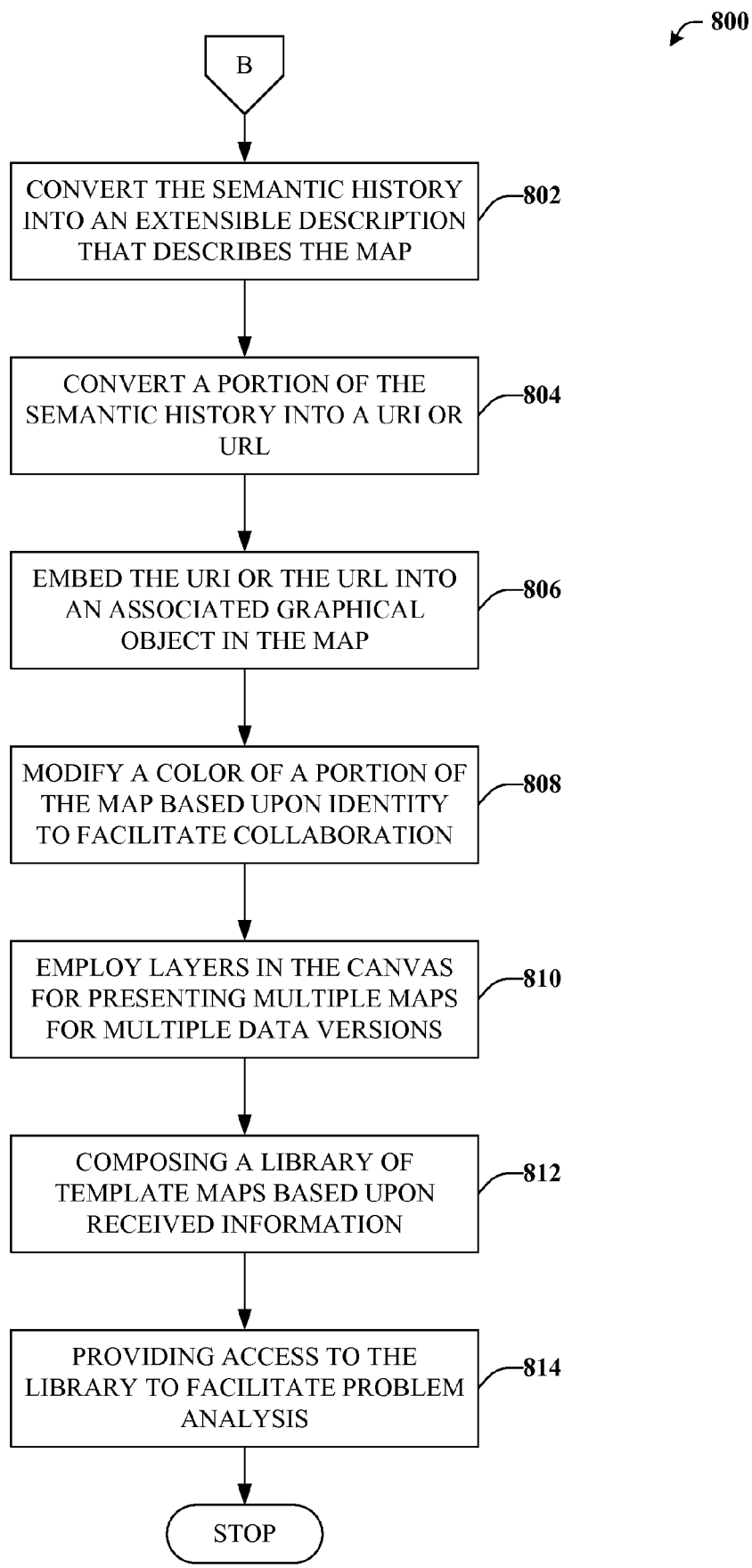
FIG. 8 depicts an exemplary flow chart of procedures defining a method for providing additional features with respect to data analysis in a work environment.

FIGS. 6, 7, and 8 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 6, exemplary method 600 for constructing a map for summarizing analyses with respect to data included in a database and for displaying the map in a canvas space is illustrated. Generally, at reference numeral 602, an operation associated with an entity included in a database can be received. In more detail, the entity can be one or more sets of related records stored in the database and the operation can act upon the entity by way of filtering records, sorting records, joining records and so on. Appreciably, the operation can also be a transformation such as applying a function to values or other data stored in the records.

At reference numeral 604, the result of the operation can be displayed in the workspace. Typically, the result will be in the form of a chart such as a graphical chart with values plotted along various axes of a graph. At reference numeral 606, a semantic history of analyses associated with the operation can be documented. For example, rather than recording the result itself, which could include a rather large amount of data, the semantics of the operation can be stored such that the operation can be executed at a later time by processing these semantics in a manner similar to processing the operation to yield the result.

Next, at reference numeral 608, a map of the semantic history can be constructed in which the entity is represented as a hub in the map and the operation that acts on the entity is represented in the map as a spoke that emanates from the hub. Then, at reference numeral 610, the map can be displayed in a canvas, wherein the canvas can be a separate or otherwise distinct display area with respect to the workspace.

Referring to FIG. 7, exemplary method 700 for providing additional features with respect to the map displayed in the canvas is depicted. Initially, at reference numeral 702, a thumbnail of the result displayed in the workspace (detailed at act 604 supra) can be represented in the map, which is displayed in the canvas. At reference numeral 704, a second hub that is graphically connected to the hub (detailed at act 608 supra) by the spoke can be represented in the map. It should be appreciated that the second hub can be the thumbnail. As well, the second hub can be a second entity comprising a subset or a superset of the entity defined by the operation. For example, the second entity can be the based upon a filter, join, sort, etc. of the first entity as defined by the operation. As another example, the second hub can represent a subset of the map, wherein several hubs and spokes can be collapsed into a single, logical container hub. This container hub can be presented with a different appearance to denote its disparate status and can later be expanded again when, for example, a user is interested in its contents. Appreciably, the container hub can provide an abstraction mechanism for dealing with large maps.

Next, at reference numeral 706, an input originating with the canvas can be obtained. The input can be, e.g., an annotation relating to analysis associated with a portion of the canvas. For example, the annotation can be an indication of a quality or degree of insight of a particular analytical path and can be in the form of text, audio-visual content, an icon and so forth. Additionally or alternatively, the input can be a selection of an object included in the canvas. For instance, a hub, a spoke, a thumbnail, an annotation, et al. can be the object in the canvas that is selected.

If the input is an annotation, then at reference numeral 708, the annotation can be stored to at least one of the map or a data store as described herein. On the other hand, if the input is a selection, then at reference numeral 710, an analytical result associated with the selected object (e.g., an object of the map included in the canvas) can be displayed in the workspace in full detail.

With reference now to FIG. 8, method 800 for providing additional features with respect to data analysis in a work environment is illustrated. Generally, at reference numeral 802, the semantic history of the analyses associated with the operation (or with the workspace) can be converted into a lightweight extensible description that describes the map.

At reference numeral 804, a portion of the semantic history of the analyses can be converted into a network-accessible URI or URL, and at reference numeral 806, the URI or URL can be embedded into an associated graphical object included in the map. For example, the URI (or URL) can be a link to underlying source data such as that included in the database called by the associated portion of the semantic history. This link can be embedded in a hub or spoke (e.g. graphical object) included in the map such that by clicking on the object, the source data can be accessed.

Turning now to reference numeral 808, a color of a portion of the map can be modified based upon identity. For instance, analysts A and B can be performing open-ended analysis aimed at ERP optimization or problem solving, each according to his or her own hypotheses and each performing potentially different operations upon different entities in the database. Appreciably, a canvas that includes a map summarizing analyses from both analysts can be color-coded (based upon the identity of the contributing party) such that hubs and spokes from analyst A can be, say outlined in red, whereas those analytical branches mapped as a result of the work of analyst B can be outlined in a different color.

Next, at reference numeral 810, the canvas can include a plurality of layers, which can be employed for presenting multiple maps. For example, each layer can include one map, which can be substantially similar to all other maps (e.g., substantially similar or identical semantic history that defines each map). However, the underlying data source for each map can differ such as a different version for the underlying database.

In another aspect of the claimed subject matter, as described at reference numeral 812, a library of template maps can be composed based upon information relating to at least one of a goal of analyses conducted in the workspace or a solution discovered during analysis. It should be understood that one or both the goal and the solution can be expressly indicated by, e.g., an analyst. Additionally or alternatively, these elements can be dynamically inferred based upon, e.g., the course of the analysis such as operations and entities employed, annotations, and the like. Next, at reference numeral 814, access to the library can be provided to facilitate problem analysis. For example, the solutions a previous analytical work can be utilized to provide suggestions or ideas (complete with previous analysis) for subsequent work with a similar goal.

Figure 9:
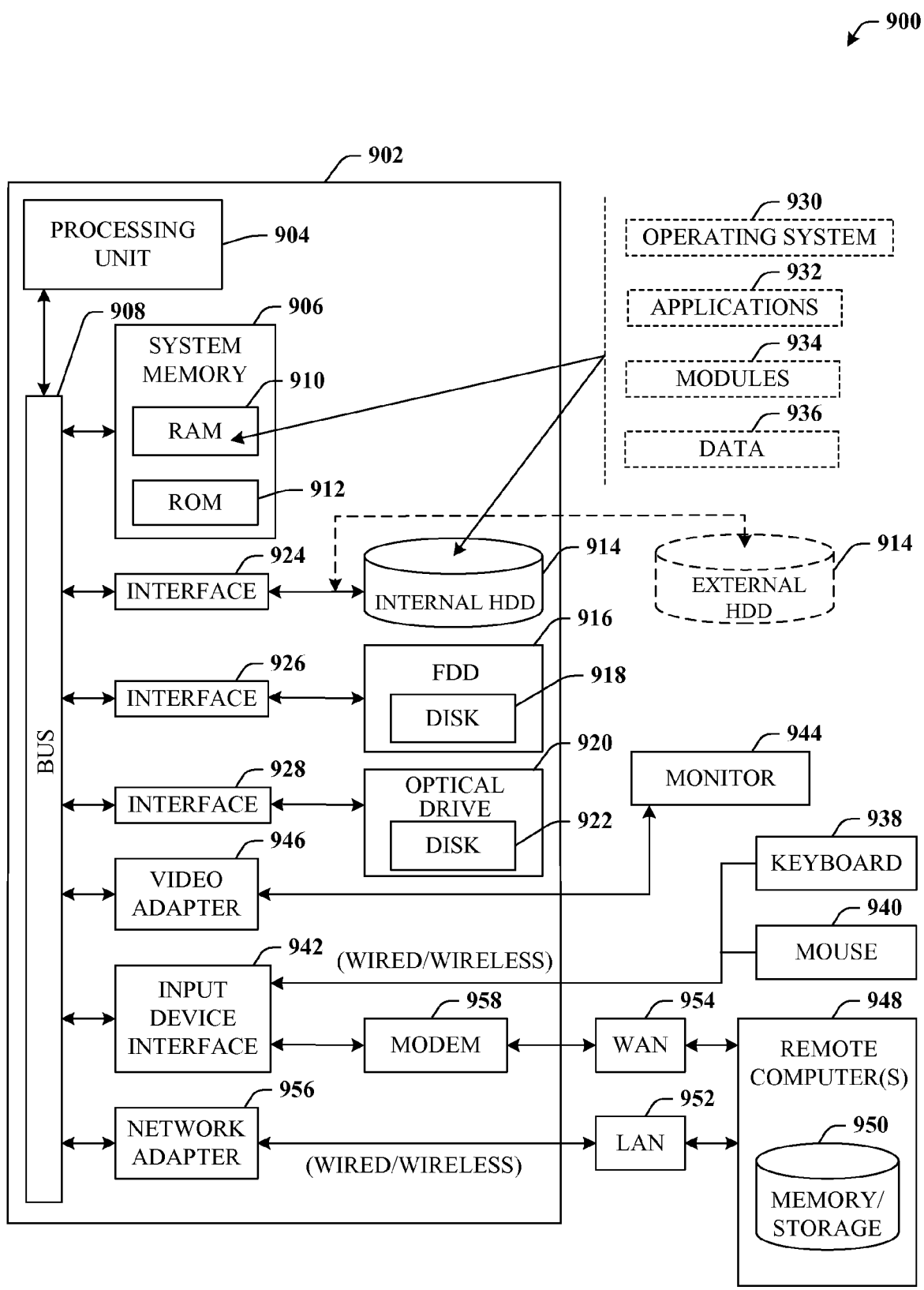
FIG. 9 illustrates a block diagram of a computer operable to execute the disclosed architecture.

Referring now to FIG. 9, there is illustrated a block diagram of an exemplary computer system operable to execute the disclosed architecture. In order to provide additional context for various aspects of the claimed subject matter, FIG. 9 and the following discussion are intended to provide a brief, general description of a suitable computing environment 900 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the claimed subject matter includes a computer 902, the computer 902 including a processing unit 904, a system memory 906 and a system bus 908. The system bus 908 couples to system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g. reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the claimed subject matter can be implemented with various commercially available operating systems or combinations of operating systems.

A user can enter commands and information into the computer 902 through one or more wired/wireless input devices, e.g. a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g. the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 9 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 10:
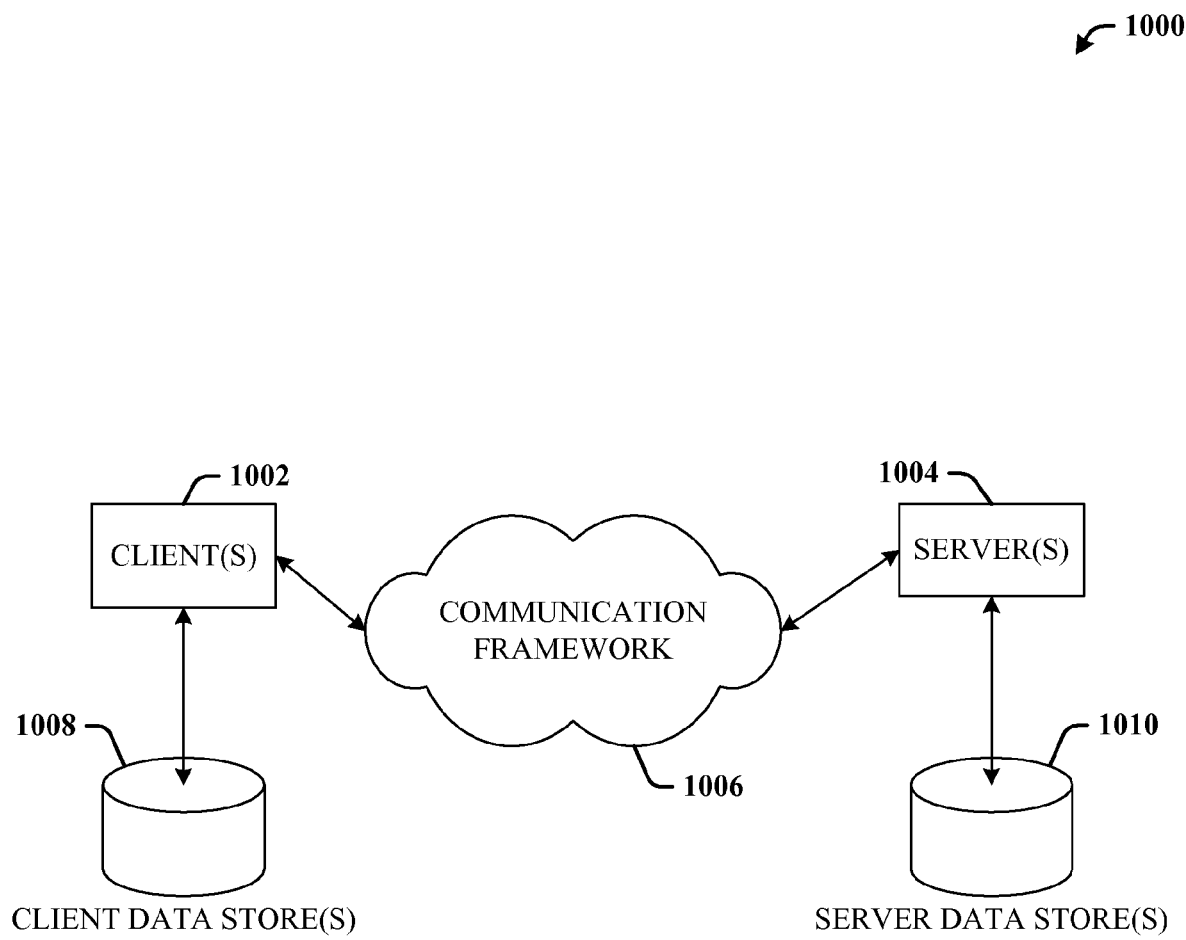
FIG. 10 illustrates a schematic block diagram of an exemplary computing environment.

Referring now to FIG. 10, there is illustrated a schematic block diagram of an exemplary computer compilation system operable to execute the disclosed architecture. The system 1000 includes one or more client(s) 1002. The client(s) 1002 can be hardware and/or software (e.g., threads, processes, computing devices). The client(s) 1002 can house cookie(s) and/or associated contextual information by employing the claimed subject matter, for example.

The system 1000 also includes one or more server(s) 1004. The server(s) 1004 can also be hardware and/or software (e.g., threads, processes, computing devices). The servers 1004 can house threads to perform transformations by employing the claimed subject matter, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that provides a canvas interface to facilitate summarization of analyses with respect to data included in a database, the system comprising:
    at least one processor coupled to memory for execution of components including:
        a user interface component that is operatively coupled to a database and a workspace, the user interface component receives an operation associated with a first entity included in the database, the user interface component displays in the workspace a result of the operation;
        a documentation component that records to a data store a semantic history of both the operation and the first entity;
        a mapping component that graphically displays in a canvas a map of the semantic history, the first entity being represented in the map as a first hub and the operation that acts on the first entity being represented in the map as one of a plurality of spokes that radiate from the first hub to terminate on a second entity represented in the map as a second hub, wherein at least one other operation associated with another of the plurality of spokes that does not terminate on a hub is displayed as a dead-end outcome of the analyses, the plurality of spokes representing one or more branches of the map, the mapping component being configured to receive an input via the canvas, the input including an annotation indicating a quality of at least one of a hub or an associated branch of the map; and
        an intelligence component to infer a goal associated with the analyses or a solution associated with the analyses based in part on an examination of the quality indicated by the annotation.

2. The system of claim 1, the operation is at least one of a filter, a slice, an aggregation, a sort, or a join that acts on the first entity or a data transformation.

3. The system of claim 1, the first entity is one or more sets of related records.

4. The system of claim 1, the result displayed in the workspace is represented in the map in thumbnail form as the second hub, the second hub is graphically connected to the first hub by the spoke.

5. The system of claim 1, the result is reduced to a key performance indicator (KPI) and the documentation component records the semantics of the KPI.

6. The system of claim 1, the annotation relates to an insight apparent from analysis conducted in the workspace, the documentation component that further records the annotation.

7. The system of claim 1, the annotation includes at least one of text, audio/visual content, a thumbnail, an icon, animation, or instructions for animation.

8. The system of claim 1, the input is a selection of a portion of the map and the user interface component displays in the workspace an associated analysis defined by the selected portion in full detail.

9. The system of claim 1, the documentation component converts the semantic history of analyses performed in the workspace to a lightweight extensible description that defines the map, the mapping component interprets the description to display the map in the canvas.

10. The system of claim 1, the documentation component converts a portion of the semantic history of analyses performed in the workspace to a network accessible uniform resource indicator (URI), the URI is embedded in an associated graphical object included in the map.

11. The system of claim 1, the mapping component facilitates collaboration by color coding output to the canvas and/or branches of the map based upon an identity.

12. The system of claim 1, the canvas includes a second layer, the second layer includes a second map of semantic history that is substantially identical to that of the map, but is distinctly applied to a disparate database, the disparate database has a substantially similar shape as the database.

13. The system of claim 1, the documentation component aggregates or transmits information associated with at least one of the goal associated with the analyses conducted in the workspace or the solution associated with the analyses and illustrated by the map, the aggregated or transmitted information being employed to create a library of suggested analyses paths and/or template maps for a particular stated problem.

14. The system of claim 13, the library is network accessible and the documentation component retrieves a relevant template map and relevant suggested analyses paths from the library based upon input that relates to the goal or stated problem.

15. A method implemented in part by a computing device for constructing a map for summarizing analyses with respect to data included in a database and for displaying the map in a canvas space, the method comprising: receiving an operation associated with an entity included in a database; displaying a result of the operation in a workspace; documenting a semantic history of analyses associated with the operation; constructing a map of the semantic history in which the entity is represented as a hub in the map and the operation that acts on the entity is represented in the map as a spoke that emanates from the hub, wherein at least one other operation associated with another spoke that does not terminate on a hub is displayed as a dead-end outcome of the analyses; obtaining an input originating with the canvas, the input being an annotation relating to an analysis associated with a portion of the canvas being annotated, the annotation representing a quality of the analyses associated with the operation; determining, by the computing device, at least one of a goal or solution associated with the analyses based in part on examination of the quality indicated by the annotation; displaying the map in the canvas space; and displaying changes that occur to at least a reduction of the map in a dashboard as at least one of the data or the map changes over time, the reduction including one or more of a most important or a most relevant aspect of the changes.

16. The method of claim 15, further comprising at least one of the following acts:
- representing in the map a thumbnail of the result;
- representing in the map a second hub that is graphically connected to the hub by the spoke, the second hub is at least one of the thumbnail or a second entity comprising a subset or a superset of the entity as defined by the operation;
- obtaining another input originating with the canvas, the another input is a selection of an object included in the canvas;
- storing the annotation to at least one of the map or a data store; or
- displaying in the workspace an analytical result associated with the selected object included in the canvas.

17. The method of claim 15, further comprising at least one of the following acts:
- converting the semantic history of the analyses associated with the operation or the workspace into a lightweight extensible description that describes the map;
- converting a portion of the semantic history of the analyses into a network-accessible URI or URL;
- embedding the URI or URL into an associated graphical object included in the map;
- modifying a color of a portion of the map based upon identity for facilitating collaboration;
- employing layers in the canvas for presenting multiple maps, each layer including a single map which utilizes a different version of the database;
- composing a library of template maps based upon information relating to at least one of a goal of analyses conducted in the workspace or a solution discovered during analysis; or
- providing access to the library to facilitate problem analysis.

18. A computer-implemented system that generates a map that summarizes data analyses operations upon an enterprise resource planning (ERP) database, the system comprising: at least one processor coupled to memory for execution of components including:
- a user interface component that is operatively coupled to an ERP database and a workspace, the user interface component that:
  - receives an operation associated with an entity included in the database and further displays in the workspace a result of the operation, the result being associated with a resultant entity that corresponds to the operation, the operation is at least one of a filter, a join, or a sort operation that acts upon the entity and the entity is one or more sets of related records included in the database; and
  - receives a further operation associated with the entity, the further operation resulting in a dead-end data analysis operation;
- a documentation component that:
  - records to a data store a semantic history of the operation, the further operation and the entity;
  - determines at least one of a goal or solution associated with the data analyses operations based in part on examination of an annotation input by a user, the annotation representing a quality of at least one of the operation or the further operation in obtaining at least one of the goal or the solution; and
  - converts the semantic history into a lightweight extensible description format that describes the map; and
- a mapping component that graphically displays the map in a canvas area of a display that is distinct from the workspace, the entity being represented in the map as a hub and the operation that acts on the entity being represented in the map as a spoke that emanates from the hub and terminates on the resultant entity, the further operation being represented in the map as another spoke that does not terminate on an entity, the map graphically representing that the further operation results in the dead-end data analysis operation.

* * * * *